United States Patent [19]

Wakamiya

[11] Patent Number: 4,836,665
[45] Date of Patent: Jun. 6, 1989

[54] OBJECTIVE LENS
[75] Inventor: Koichi Wakamiya, Tokyo, Japan
[73] Assignee: Nikon Corporation, Tokyo, Japan
[21] Appl. No.: 242,684
[22] Filed: Sep. 9, 1988
[30] Foreign Application Priority Data Sep. 26, 1987 [JP] Japan ................................ 62-242298

[51] Int. Cl.$^4$ .............................................. G02B 9/20
[52] U.S. Cl. .................................... 350/476; 350/450
[58] Field of Search ................ 350/474, 475, 476, 450

[56] References Cited

U.S. PATENT DOCUMENTS

| | | | |
|---|---|---|---|
| 3,953,112 | 4/1976 | Imai | 350/476 |
| 4,192,579 | 3/1980 | Hyakumura | 350/476 |
| 4,606,615 | 8/1986 | Wakamiya | 350/476 |
| 4,676,607 | 6/1987 | Wakamiya | 350/476 |

Primary Examiner—John K. Corbin
Assistant Examiner—Scott J. Sugarman
Attorney, Agent, or Firm—Shapiro and Shapiro

[57] ABSTRACT

An objective lens having a stop provided most adjacent to the image side comprises, in succession from the object side, a first lens which is a positive meniscus lens having its convex surface facing the object side, a second lens which is a biconcave lens, a third lens which is a biconvex lens, and a fourth lens which is a negative meniscus lens having its convex surface facing the image side and is joined to the third lens and formed into a compositely positive cemented lens. The objective lens satisfies the following conditions:

(1) $0.28f < \Sigma d < 0.36f$
(2) $1.58 < n_2 < 1.745$
(3) $n_1 < n_2$
(4) $0.24 < n_3 - n_4 < 0.30$
(5) $0.6f < f_1 < 1.0f$
(6) $0.30f < -r_6 < 0.40f$
(7) $f < -r_7 < 2f$
(8) $10 < \nu_4 - \nu_3 < 25$
(9) $2 < (d_5 + d_6)/d_3 < 9.9$
(10) $0.18f < d_1 + d_5 + d_6 < 0.24f$
(11) $0.28f < r_1 < 0.31f$ where
$\Sigma d$: the full length of the lens system
$f$: the focal length of the lens system
$r_i$: the radius of curvature of the ith surface from the object side
$d_i$: the spacing of the ith surface from the object side
$n_i$: the refractive index of the ith lens from the object side
$\nu_i$: the Abbe number of the ith lens from the object side
$f_1$: the focal length of the first lens.

8 Claims, 1 Drawing Sheet

OBJECTIVE LENS

BACKGROUND OF THE INVENTION

1. Field of the Invention

This invention relates to improvements in a triplet objective lens, and in particular to a behind stop modified Tessar type objective lens of compact three-group four-lens construction in which the angle of view amounts to 60° or greater and the brightness amounts to F3.5.

2. Related Background Art

A so-called Tessar type lens which is an objective lens comprising three components, i.e., a diverging biconcave lens and two converging portions with the diverging biconcave lens interposed therebetween has the features that its full length is relatively short and that the fluctuations of aberrations by the object distance are relatively small, and is known as a compact objective lens optical system. Particularly, a lens of the behind stop type in which a stop is provided rearwardly (on the image side) of the lens system permits distance adjustment to be accomplished by fixing the stop on the optic axis and axially moving only the lens and therefore is most suitable for the distance adjusting mechanism of a compact auto focus camera, and has often been put into practical use. In the ordinary Tessar type lens, a third component has a cemented surface convex relative to the object side, but many modified Tessar type lenses in which the third component has a cemented surface concave relative to the object side are also known. In such modified Tessar type, the sagittal plane is somewhat flat and the full length of the lens can be balanced to a slightly short length.

Generally, however, in the case of an objective lens provided with a behind stop, the light ray of an oblique light flux which passes through the marginal portion of a first lens passes through a location near the center of the stop and therefore, a decrease in the marginal light is liable to become conspicuous, and this leads to the disadvantage that it is difficult to correct the deficiency of the quantity of marginal light even if the variable stop is stopped down. In a Tessar type lens comprised of three components, it is possible to reduce the decrease in the marginal light considerably by making the effective diameter of the first lens large, but occurrence of coma and chromatic coma is conspicuous. Particularly, in the conventional modified Tessar type lens in which a third component has a cemented surface concave relative to the object side, occurrence of chromatic coma has been remarkable.

SUMMARY OF THE INVENTION

It is therefore an object of the present invention to provide a behind stop objective lens in which a compact form is kept and yet various aberrations, particularly, coma and astigmatism, are corrected better than in the conventional lens and moreover chromatic coma which is the above-noted disadvantage is corrected well in a modified Tessar type lens system of three-group four-lens construction.

The objective lens according to the present invention is a behind stop lens which comprises, in succession from the object side, a first lens L1 which is a positive meniscus lens having its convex surface facing the object side, a second lens L2 which is a biconcave lens, and a positive composite lens comprising a third lens L3 which is a biconvex lens and a fourth lens L4 which is a negative meniscus lens having its convex surface facing the image side, said third and fourth lenses L3 and L4 being cemented together, and in which is stop is provided most adjacent to the image side, and is characterized in that the values of the full length $\Sigma d$ of the lens system from that surface of the first lens L1 which is adjacent to the object side to that surface of the fourth lens L4 which is adjacent to the image side, the refractive index $n2$ of the second lens L2, the difference $n3-n4$ between the refractive indices of the third lens L3 and the fourth lens L4, the focal length $f1$ of the first lens L1, the radius of curvature $r4$ of that surface of the first lens L1 which is adjacent to the object side, the radius of curvature $r6$ of the cemented surface of the third lens L3 and the fourth lens L4, the radius of curvature $r7$ of that surface of the fourth lens L4 which is adjacent to the image side, the difference $\nu4-\nu3$ between the Abbe numbers of the fourth lens L4 and the third lens L3, the ratio $(d5+d6)/d3$ of the thickness $(d5+d6)$ of the composite lens L3, L4 to the thickness $(d3)$ of the second lens L2, and the sum $d1+d5+d6$ of the thicknesses of the first lens L1 and the composite lens L3, L4 are limited within ranges which will hereinafter be described.

According to the present invention, there is provided a behind stop modified Tessar type lens which is a compact lens in which the angle of view is 60° or greater and the brightness amounts to F3.5 and yet various aberrations are corrected well and particularly, coma and astigmatism are corrected better than in the conventional lens and at the same time, chromatic coma is also corrected well and further, distortion is small.

Other objects, features and effects of the present invention will become more fully apparent from the following description.

DESCRIPTION OF THE PREFERRED EMBODIMENTS

Figure 1:
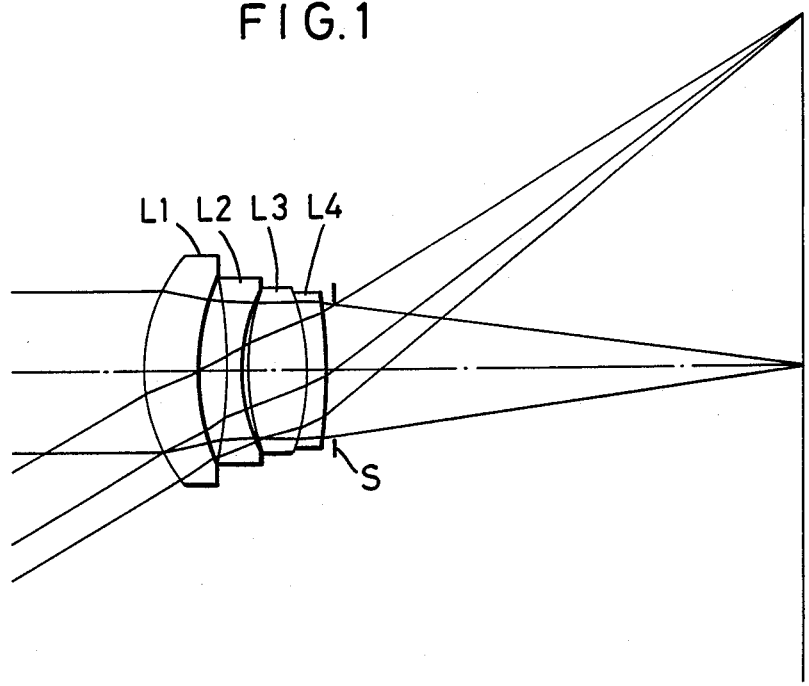
FIG. 1 is the optical path diagram of a behind stop objective lens showing a first embodiment of the present invention.
Figure 2:
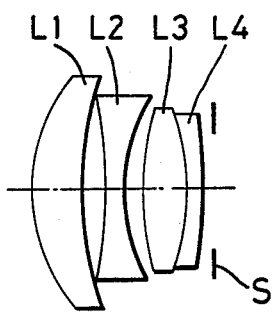
FIG. 2 is a cross-sectional view of a second embodiment of the present invention.

The objective lens of the present invention is a behind stop lens which, as shown in FIGS. 1 and 2, comprises in succession from the object side a first lens L1 which is a positive meniscus lens having its convex surface facing the object side, a second lens L2 which is a biconcave lens, a third lens L3 which is a biconvex lens, and a fourth lens L4 which is a negative meniscus lens having its convex surface facing the image side, said third lens L3 and said fourth lens L4 being joined together and form into a compositely positive cemented lens, and which further has a stop S on the side most adjacent to the image side of the lens system, and which satisfies the following conditions:

(1) $0.28f < \Sigma d < 0.36f$
(2) $1.58 < n2 < 1.745$
(3) $n1 > n2$
(4) $0.24 < n3-n4 < 0.30$
(5) $0.6f < f1 < 1.0f$
(6) $0.30f < -r6 < 0.40f$
(7) $f < -r7 < 2f$
(8) $10 < \nu4-\nu3 < 25$
(9) $2 < (d5+d6)/d3 < 9.9$

(10) $0.18f < d1+d5+d6 < 0.24f$
(11) $0.28f < r1 < 0.31f$
where $\Sigma d$: the full length of the lens system, i.e., the distance from the foremost lens surface to the last lens surface $f$: the combined focal length of the lens system $ri$: the radius of curvature of the ith surface from the object side $di$: the spacing of the ith surface from the object side $ni$: the refractive index of the ith lens from the object side $vi$: the Abbe number of the ith lens from the object side $f1$: the focal length of the first lens.

The above-mentioned conditions will hereinafter be described in detail.

Condition (1) is a condition for correcting coma and the quantity of marginal light well. If the full length is great beyond the upper limit of this condition, to secure a predetermined quantity of marginal light, it becomes necessary that an oblique light ray enter from a height distant from the optic axis. Thus, the light flux necessarily passes through the portions of the first lens L1 and the second lens L2 which are nearer to the edges thereof, and high-order aberrations occur and particularly coma is aggravated. If the full length exceeds the lower limit of this condition, the aggravation of coma tends to decrease, but the lens thickness and the air thickness become small and therefore, the effective diameter of each lens becomes small and the oblique light flux is intercepted by the first lens L1 and the second lens L2, and the quantity of marginal light becomes insufficient.

Conditions (2), (3) and (4) are conditions for correcting the Petzval sum well. In a popular phototaking lens, the entire system has a positive power and therefore has a positive Petzval sum, and to correct this, it is effective to make the convex lens high in refractive index and make the concave lens low in refractive index. The condition (3) that $n2 < n1$ is a condition necessary to correct the Petzval sum. If the refractive index n2 of the second lens L2 which is a negative lens exceeds the upper limit of condition (2), the refractive index is too high relative to the convex lens and therefore, correction of the Petzval sum is not done. If n2 exceeds the lower limit of condition (2), it is effective for the correction of the Petzval sum, but the radius of curvature of the second lens L2 becomes small to keep the focal length and therefore, high-order aberrations of divergent property occur in the marginal portion of the lens and coma is aggravated and good correction is not accomplished.

If the difference between the refractive indices of the third lens L3 and the fourth lens L4, i.e., the value of condition (4), exceeds the lower limit, the Petzval sum is also under-corrected. Also, as the difference in refractive index between the third lens L3 which is a positive lens and the fourth lens L4 which is a negative lens (n3−n4) is greater, it is more advantageous for the correction of the Petzval sum, but if the upper limit of condition (4) is exceeded, the converging action in the cemented surface becomes too strong with a result that the bulge of spherical aberration increases and this cannot be corrected.

Condition (5) is a condition effective for the correction of distortion. In the behind aperture lens, positive distortion is usually liable to occur. Particularly, if the focal length of the positive lens (e.g. L1) farthest from the stop becomes short and the refractive power thereof increases, positive distortion is increased. If the power limit of condition (5) is exceeded, positive distortion becomes strong and is not corrected well. As the value of the focal length f1 of the first lens L1 is greater, correction of distortion is easier, but the focal length of the composite positive lens comprising the third lens L3 and the fourth lens L4 cemented together becomes short in order that the focal length as the entire system may be of a predetermined value. If the value of the focal length f1 of the first lens L1 exceeds the upper limit of condition (5), the converging action of the cemented positive lens comprising the third lens L3 and the fourth lens L4 becomes too strong, and particularly, as the angle of view becomes greater, the coma above the principal ray is sharply aggravated and becomes difficult to correct.

Conditions (6) and (7), with condition (5), are conditions for correcting coma well. First, condition (6) prescribes the direction and curvature of the cemented surface between the third and fourth lenses L3 and L4. This cemented surface has its sharper concave surface facing the object side and particularly has the strong action of converging the light flux below the principal ray of the oblique light flux. By well balancing the strong converging property of this cemented surface with the strong diverging property in the second lens L2, the coma below the principal ray can be well balanced. If the radius of curvature r6 of the cemented surface exceeds the upper limit of condition (6), the converging action of the cemented surface weakens and the diverging property in the second lens L2 is relatively strongly influenced and coma, particularly, the lower coma, is aggravated and is not corrected. Also, the second lens L2 is a flint lens having a high dispersing power and therefore, causes a light of short wavelength (g-line) to diverge sharply, and chromatic coma becomes aggravated and is not corrected. If the lower limit of condition (6) is exceeded, the converging property of the cemented surface becomes relatively strong and the lower coma occurs in the opposite direction and is not corrected well.

Condition (7) prescribes the range of the radius of curvature of the last lens surface, which is a surface for converging the light rays. This converging action converges the light flux below the principal ray of the oblique light flux more effectively, but the last surface does not cause high-order aberrations to occur so much as the cemented surface between the third and fourth lenses L3 and L4. Therefore it has the effect of converging the lower light flux in the entire picture plane. Accordingly, by well balancing the converging action which affects the entire picture plane of the last surface with the converging action of the cemented surface between the third and fourth lenses L3 and L4 which works particularly remarkably at a great angle of view and the diverging action of the second lens L2, it becomes possible to correct the coma below the principal ray of the oblique light flux well. If the radius of curvature r7 of the last surface of the fourth lens L4 exceeds the upper limit of condition (7) and the converging action thereof weakens, the lower coma of a small angle of view becomes negative and aggravated and good correction thereof is not accomplished. Also, if the converging action strengthens beyond the lower limit of condition (7), the lower coma of a small angle of view conversely becomes positive and aggravated and again, good correction thereof is not accomplished.

Condition (8) is a condition for correcting chromatic coma better. The second lens L2 is flint glass and therefore, in a Tessar type lens, a light of short wavelength (g-line) is made excessively divergent by the second lens L2 and chromatic coma occurs. To correct this more effectively, it is better to utilize the converging action of the cemented positive lens comprising the third and fourth lenses L3 and L4, and the light of short wavelength (g-line) can be converged sharply by the surfaces of these lenses. Condition (8) is a condition effective for this, and as the difference ($\nu 4 - \nu 3$) between the Abbe numbers of the third lens L3 and the fourth lens L4 has a greater value, the influence of high-order aberrations strengthens and good correction is ensured. If the upper limit of condition (8) is exceeded, the dispersion of the third lens L3 becomes relatively great and therefore, the on-axis chromatic aberration becomes under-corrected and cannot be corrected well. On the other hand, if the lower limit of this condition (8) is exceeded, the correcting effect for chromatic coma becomes small and good correction of chromatic coma becomes difficult.

Condition (9) regards the center thickness of the composite positive lens comprising the third lens L3 and the fourth lens L4 cemented together. In a positive lens, generally, spherical aberration and curvature of meridional image field have negative values. In the rearward cemented positive lens component in a popular Tessar type lens, the cemented surface has a converging action and therefore, spherical aberration and curvature of meridional image field are caused to occur more negatively. These are corrected chiefly by a negative lens, but when the aberrations by the negative lens are great, the influence of high-order aberrations resulting from correction becomes strong and the bending of spherical aberration and the bending of curvature of meriodional image field become remarkable. Also, to reduce the occurrence of negative spherical aberration and negative curvature of image field caused by the positive lens, it is generally known that it is effective to increase the center thickness of the positive lens. So, in the present invention, by prescribing the combined center thickness ($d5+d6$) of the third and fourth lenses L3 and L4 forming the composite positive lens as shown in condition (9) relative to the center thickness d3 of the negative lens L2, the bulge of spherical aberration and the bending of curvature of meridional image field are corrected. As the value of condition (9) is greater, it is possible to reduce the bulge of spherical aberration and the bending of curvature of meridional image field, but as the thickness of the cemented positive lens comprising the third and fourth lenses L3 and L4 becomes greater, the oblique light ray tends to become farther from the optic axis at the position of the stop and at last, deficiency of the quantity of marginal light results. If the upper limit of condition (9) is exceeded, the quantity of marginal light is insufficient, and if the lower limit of condition (9) is exceeded, the bulge of spherical aberration and the bending of curvature of meridional image field become great and good correction of aberrations cannot be accomplished.

Condition (10) prescribes the total center thickness of the positive lens components of the lens system in the present invention. If the upper limit of condition (10) is exceeded, the quantity of marginal light decreases, and if the lower limit of condition (10) is exceeded, curvature of image field becomes remarkable. Also, condition (11) prescribes an appropriate radius of curvature of the foremost lens surface. If the upper limit of this condition (11) is exceeded, curvature of image field increases, and if the lower limit of this condition is exceeded, spherical aberration becomes remarkable and good correction thereof becomes difficult. In the aforedescribed condition (10), it is desirable that the thickness d1 of the first lens L1 satisfy the following condition:

(12) $0.08f < d1 < 0.1f$

Further, in the present invention, the quantity of marginal light of the lens is secured sufficiently and moreover, the first lens L1 and the second lens L2 contact with each other at the marginal portions thereof as shown in FIG. 1 and the second lens L2 and the third lens L3 contact with each other at the marginal portions thereof as shown in FIG. 1, whereby the objective lens can be constructed without the use of a spacer. As the condition therefor, it is desirable that

(13) $d2 > d4$.

Also, as a condition for keeping the upper coma good, it is desirable that the radius of curvature r5 of that surface of the third lens L3 which is adjacent to the object side satisfy the following condition:

(14) $0.45f < r5 < 0.70f$

Furthermore, as a condition for keeping astigmatism good, it is desirable that the radius of curvature r2 of that surface of the first lens L1 which is adjacent to the image side satisfy the following condition:

(15) $0.45f < r2 < 0.75f$

Tables 1 and 2 below show the data of two embodiments, respectively, of the present invention. The first embodiment shown in Table 1 and the second embodiment shown in Table 2 are ones in which the focal length $f=100$ and F-number is 3.5. In the tables below, the numbers at the left end represent the order from the object side. Also, Bf represents the back focal length, f1 represents the focal length of the first lens, f2 represents the focal length of the second lens, and f3 represents the combined focal length of the third and fourth lenses.

TABLE 1

(First Embodiment)
Focal length f = 100, F3.5

| No. | Radius of curvature r | Center thickness and space d of the lens | Refractive index n | Abbe number $\nu$ |
|---|---|---|---|---|
| 1 | 30.652 | 9.860 | 1.76684 | 46.76 |
| 2 | 46.915 | 3.483 | | |
| 3 | −97.714 | 3.055 | 1.69895 | 30.09 |
| 4 | 30.640 | 1.186 | | |
| 5 | 46.123 | 10.554 | 1.79668 | 45.42 |
| 6 | −38.252 | 2.777 | 1.51680 | 64.12 |
| 7 | −134.225 | | | |

Bf = 81.155
Σd = 30.914
f1 = 91.287
f2 = −33.049
f3 = 36.848

TABLE 2

(Second Embodiment)
Focal length f = 100, F3.5

| No. | Radius of curvature r | Center thickness and space d of the lens | Refractive index n | Abbe number $\nu$ |
|---|---|---|---|---|
| 1 | 29.565 | 8.608 | 1.74400 | 45.06 |
| 2 | 69.379 | 3.055 | | |
| 3 | −141.814 | 3.332 | 1.71736 | 29.48 |
| 4 | 29.647 | 3.332 | | |
| 5 | 66.804 | 7.775 | 1.76684 | 46.76 |
| 6 | −33.811 | 2.499 | 1.51680 | 64.12 |
| 7 | −85.944 | | | |

TABLE 2-continued (Second Embodiment)
Focal length f = 100, F3.5

| No. | Radius of curvature r | Center thickness and space d of the lens | Refractive index n | Abbe number ν |
|---|---|---|---|---|
| | | Bf = 81.140 | | |
| | | Σd = 28.602 | | |
| | | f1 = 63.397 | | |
| | | f2 = −33.907 | | |
| | | f3 = 47.495 | | |

These embodiments are ones in which positive distortion liable to occur in a behind stop modified Tessar type lens like the lens according to the present invention is corrected to a further smaller value. As a condition for correcting distortion to a smaller value as in the embodiments, it is desirable that the following condition be satisfied:

(16) $1.3 < (f1/f3) < 2.6$, where f1 is the focal length of the first lens, and f3 is the combined focal length of the third lens L3 and the fourth lens L4. If the upper limit of condition (16) is exceeded, distortion becomes negative, and if the lower limit of condition (16) is exceeded, distortion becomes positive.

I claim:

1. An objective lens having a stop provided most adjacent to the image side, comprising, in succession from the object side, a first lens which is a positive meniscus lens having its convex surface facing the object side, a second lens which is a biconcave lens, a third lens which is a biconvex lens, and a fourth lens which is a negative meniscus lens having its convex surface facing the image side and is joined to said third lens and formed into a compositely positive cemented lens, characterized in that said objective lens satisfies the following conditions:

(1) $0.28f < \Sigma d < 0.36f$
(2) $1.58 < n2 < 1.745$
(3) $n1 > n2$
(4) $0.24 < n3 - n4 < 0.30$
(5) $0.6f < f1 < 1.0f$
(6) $0.30f < -r6 < 0.40f$
(7) $f < -r7 < 2f$
(8) $10 < \nu4 - \nu3 < 25$
(9) $2 < (d5+d6)/d3 < 9.9$
(10) $0.18f < d1+d5+d6 < 0.24f$
(11) $0.28f < r1 < 0.31f$ where
Σd: the full length of the lens system
f: the focal length of the lens system
ri: the radius of curvature of the ith surface from the object side
di: the spacing of the ith surface from the object side
ni: the refractive index of the ith lens from the object side
νi: the Abbe number of the ith lens from the object side
f1: the focal length of the first lens.

2. An objective lens according to claim 1, characterized in that the thickness d1 of said first lens satisfies the following condition:
$0.08f < d1 < 0.1f$.

3. An objective lens according to claim 1, characterized in that the spacing d2 between said first lens and said second lens and the spacing d4 between said second lens and said third lens satisfy the following condition:
$d2 > d4$.

4. An objective lens according to claim 1, characterized in that the radius of curvature r5 of that surface of said third lens which is adjacent to the object side satisfies the following condition:
$0.45f < r5 < 0.70f$.

5. An objective lens according to claim 1, characterized in that the radius of curvature r2 of that surface of said first lens which is adjacent to the image side satisfies the following condition:
$0.45f < r2 < 0.75f$.

6. An objective lens according to claim 1, characterized in that the ratio (f1/f3) of the focal length f1 of said first lens to the combined focal length f3 of said third lens and said fourth lens satisfies the following condition:
$1.3 < (f1/f3) < 2.6$.

7. An objective lens according to claim 1, characterized by the following data:

Focal length f=100, F3.5

| No. | Radius of curvature r | Center thickness and space d of the lens | Refractive index n | Abbe number ν |
|---|---|---|---|---|
| 1 | 30.652 | 9.860 | 1.76684 | 46.76 |
| 2 | 46.915 | 3.483 | | |
| 3 | −97.714 | 3.055 | 1.69895 | 30.09 |
| 4 | 30.640 | 1.186 | | |
| 5 | 46.123 | 10.554 | 1.79668 | 45.42 |
| 6 | −38.252 | 2.777 | 1.51680 | 64.12 |
| 7 | −134.225 | | | |
| | Bf = 81.155 | | f1 = 91.287 | |
| | Σd = 30.914 | | f2 = −33.049 | |
| | | | f3 = 36.848 | |

8. An objective lens according to claim 1, characterized by the following data:

Focal length f=100, F3.5

| No. | Radius of curvature r | Center thickness and space d of the lens | Refractive index n | Abbe number ν |
|---|---|---|---|---|
| 1 | 29.565 | 8.608 | 1.74400 | 45.06 |
| 2 | 69.379 | 3.055 | | |
| 3 | −141.814 | 3.332 | 1.71736 | 29.48 |
| 4 | 29.647 | 3.332 | | |
| 5 | 66.804 | 7.775 | 1.76684 | 46.76 |
| 6 | −33.811 | 2.499 | 1.51680 | 64.12 |
| 7 | −185.944 | | | |
| | Bf = 81.140 | | f1 = 63.397 | |
| | Σd = 28.602 | | f2 = −33.907 | |
| | | | f3 = 47.495 | |

* * * * *